(12) United States Patent
Stowe

(10) Patent No.: US 6,509,068 B2
(45) Date of Patent: Jan. 21, 2003

(54) METHOD FOR PASSING MULTIPLE FIBERS THROUGH A SMALL ZONE OF HIGH INTENSITY RADIANT ENERGY

(75) Inventor: Richard W. Stowe, Hillandale, MD (US)

(73) Assignee: Fusion UV Systems, Inc., Gaithersburg, MD (US)

( * ) Notice: Subject to any disclaimer, the term of this patent is extended or adjusted under 35 U.S.C. 154(b) by 0 days.

(21) Appl. No.: 10/171,984

(22) Filed: Jun. 17, 2002

(65) Prior Publication Data

US 2002/0164433 A1 Nov. 7, 2002

Related U.S. Application Data

(62) Division of application No. 09/758,206, filed on Jan. 12, 2001, now Pat. No. 6,419,743.

(51) Int. Cl.⁷ .................................................. B05D 3/02
(52) U.S. Cl. ..................... 427/559; 427/177; 427/385.5; 427/444; 427/558
(58) Field of Search ................................. 427/559, 558, 427/177, 385.5, 444

(56) References Cited

U.S. PATENT DOCUMENTS

| | | |
|---|---|---|
| 3,496,717 A | 2/1970 | Costello et al. |
| 3,686,772 A | 8/1972 | Drummond |
| 3,972,304 A | 8/1976 | Boucher |
| 4,055,875 A | 11/1977 | Strickland |
| 4,154,049 A | 5/1979 | King et al. |
| 4,302,924 A | 12/1981 | Faulstich |
| 4,388,799 A | 6/1983 | Vives |
| 4,411,130 A | 10/1983 | Dubois et al. |
| 4,620,412 A | 11/1986 | Portinari |
| 4,710,638 A | 12/1987 | Wood |
| 5,092,264 A | 3/1992 | Overton et al. |
| 5,213,644 A | 5/1993 | Phillips et al. |
| 5,307,617 A | 5/1994 | Karhu |
| 5,601,646 A | 2/1997 | Gardner et al. |

*Primary Examiner*—Bernard Pianalto
(74) *Attorney, Agent, or Firm*—Shlesinger, Arkwright & Garvey LLP

(57) ABSTRACT

A method for passing multiple fibers having curable coating thereon through a high intensity curing zone comprises an irradiator having a curing zone; a transparent tube enclosing the curing zone; a plurality of coating dies disposed upstream of the irradiator to coat the fibers; and a plurality of take-up mechanisms disposed downstream of the irradiator to guide the fibers through the curing zone. The coating dies and the take-up mechanisms are rotatably displaced relative to each other about a longitudinal axis through the centerline of the curing zone so that the fibers at an intermediate location between the coating dies and the take-up mechanisms define a cylindrical volume having a diameter less than the diameter of the tube so that the multiple fibers can pass simultaneously through the tube.

2 Claims, 3 Drawing Sheets

METHOD FOR PASSING MULTIPLE FIBERS THROUGH A SMALL ZONE OF HIGH INTENSITY RADIANT ENERGY

RELATED APPLICATION

This application is a division of application Ser. No. 09/758,206, filed Jan. 12, 2001, now U.S. Pat. No. 6,419,743, the priority benefit of which is claimed and is incorporated herein by reference.

FIELD OF THE INVENTION

The present invention is generally related to apparatus and method for curing coating materials, and specifically to apparatus and method for simultaneously irradiating curable coatings on multiple optical fibers, thread or yarn fibers or wire-like elements.

BACKGROUND OF THE INVENTION

Optical fibers, such as are used to transmit light in is various applications, including communications, typically are coated with one or more polymeric layers which are designed to protect the optical fibers from moisture and abrasion, to reduce microbending losses, and to allow easier handling of the fiber.

In a typical method of coating an optical fiber, a liquid photocurable polymeric material is applied to the surface of the fiber and it is then cured by irradiating the coated fiber with radiant energy, as for example, ultraviolet rays.

Attempts have been made in the prior art to improve the efficiency of the coating and curing process by techniques such as modifying the polymer composition and/or the coating method and selecting optimum wavelengths of the curing radiation. One area in which it has appeared that improvements can be made in the curing process is in more efficient use of the radiant energy which is used to cure the polymer.

Based on the use of a full-elliptical reflector with a tubular UV (or visible or infrared) light source at one focus and the high-intensity zone of illumination at the other, it is difficult to pass a number of fibers through the same zone at the same time. The primary difficulty is in the carrying and handling devices for each fiber, which prevents these devices from being placed close together. The coating dies or heads for coloring or coating of fiber on the "upstream" side (where the fiber will have wet coating or ink on it) prevent the fibers from being spaced closely.

OBJECTS AND SUMMARY OF THE INVENTION

It is an object of the present invention to provide an apparatus and method for passing multiple fibers through a small zone of high-intensity radiant energy, thereby making more efficient use of the existing irradiator.

In summary, the present invention provides an apparatus for passing multiple fibers having curable coating thereon through a high intensity curing zone, comprising an irradiator having a curing zone; a transparent tube enclosing the curing zone; a plurality of coating dies disposed upstream of the irradiator to coat the fibers; and a plurality of take-up mechanisms disposed downstream of the irradiator to guide the fibers through the curing zone. The coating dies and the take-up mechanisms are rotatably displaced relative to each other about a longitudinal axis through the centerline of the curing zone so that the fibers at an intermediate location between the coating dies and the take-up mechanisms define a cylindrical volume having a diameter less than the diameter of the tube so that the multiple fibers can pass simultaneously through the tube.

The present invention also provides a method for passing multiple fibers having curable coating thereon through a high intensity curing zone, comprising:

a) providing a curing zone having a diameter;

b) providing a plurality of feed guides upstream of said curing zone to guide the fibers through the curing zone c) providing a plurality of take-up guides downstream of said curing zone to take-up the fibers passing through the curing zone; and d) rotating the upstream and the downstream guides relative to each other about a longitudinal axis through the centerline of the curing zone so that the fibers at an intermediate location between the upstream and downstream guides define a cylindrical volume having a diameter less than the diameter of the curing zone.

These and other objects of the present invention will become apparent from the following detailed description.

BRIEF DESCRIPTIONS OF THE DRAWINGS

DETAILED DESCRIPTION OF THE INVENTION

Figure 1:
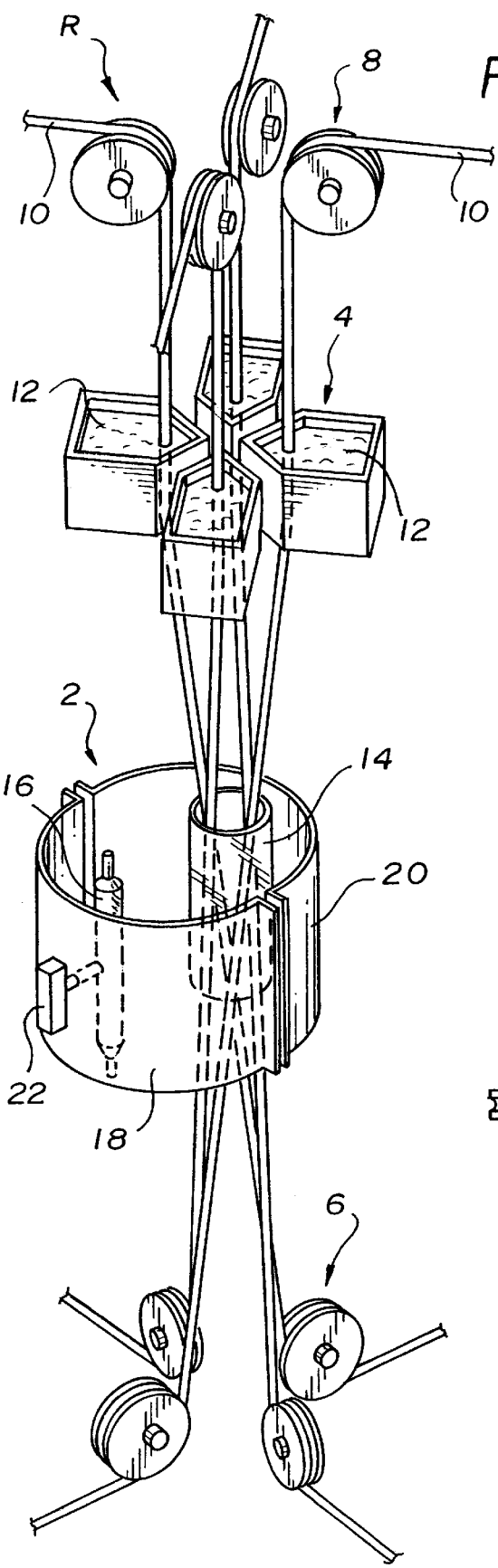
FIG. 1 is a schematic perspective view of a portion of a manufacturing line on which optical fibers are coated and cured in an irradiator.

An apparatus R made in accordance with the present invention is disclosed in FIG. 1. The apparatus R includes an irradiator 2, a plurality of coating dies 4 and a corresponding number of take-up guides, represented by pulleys 6 or other conventional means. A plurality of feed guides, represented by pulleys 8 or other standard means may be used to guide each optical fiber 10 through the respective coating die 4. The dies 4 are conventional and will not be described in detail, suffice it to say that each die contains a photocurable curable resin which is deposited on each individual fiber 10. The coating is cured by the irradiator 2 as the fibers pass through a curing zone of a high-intensity radiation energy, as substantially defined within a transparent quartz tube 14. A UV source 16 is centered along the inner focus of an elliptical reflector 18. The tube 14 is centered along the object focus of the reflector 18 and the inner focus of an elliptical reflector 20. The reflector 18 is disposed so that its foci are coincident with the foci of reflector 20.

The UV source 16 is an electrodeless bulb, which is energized by a microwave energy source 22. Other sources of UV radiation may be used.

A person skilled in the art will understand that the type of curing radiation may vary, defending on the type of the fibers and the coating being cured. For example, infrared or visible radiation may be used instead of a UV radiation to suit the coating being cured. The irradiator 2 is described in U.S. Pat. No. 4,710,638, which is hereby incorporated by reference. Any other type of irradiator which generates a zone of high intensity radiant energy may be used.

Figure 2:
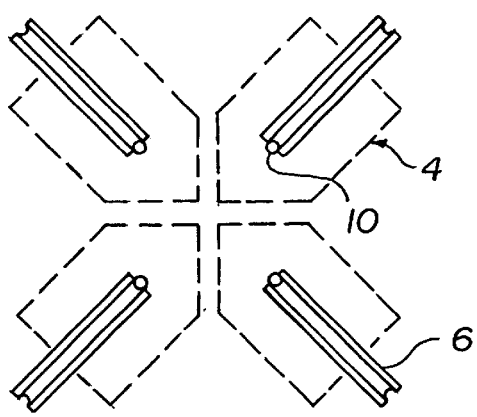
FIG. 2 is a schematic top-end view of FIG. 1, with the coating dies shown in phantom lines, prior to rotating the downstream take-up pulleys.
Figure 3:
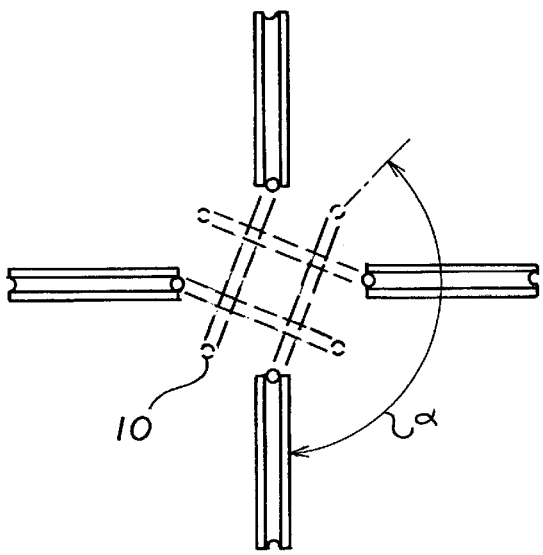
FIG. 3 is a top-end view of FIG. 1, after the take-up pulleys have been rotated relative to the coating dies.
Figure 4:
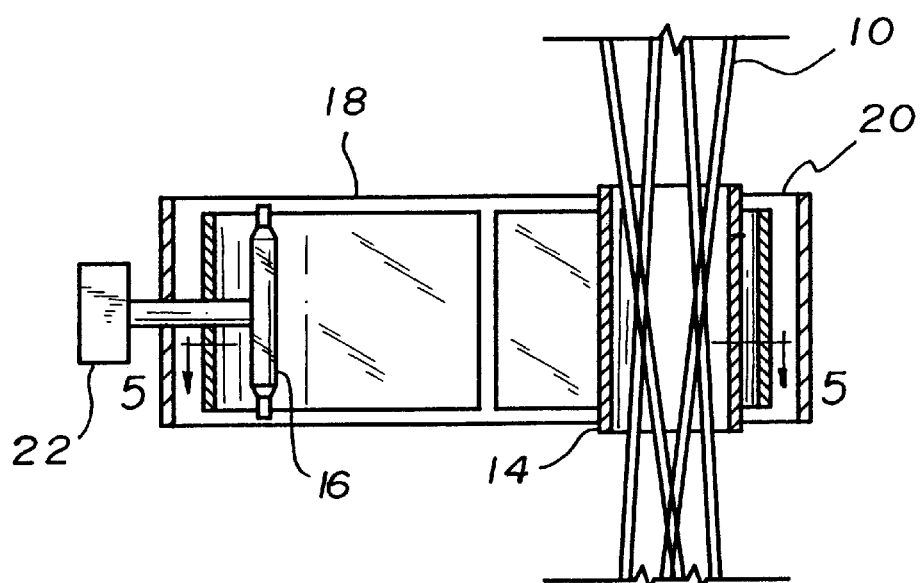
FIG. 4 is a cross-sectional view taken through the irradiator of FIG. 1.

The coating dies 12 are disposed in a generally circular pattern so that the multiple optical fibers are placed as close to each others as reasonable. Although four coating dies are illustrated, there can be any number, limited only by the physical ability to cluster them together. Prior to rotating the pattern of the take-up mechanisms 6 relative to the coating dies 12, the optical fibers will be parallel to each other but will not be close enough to pass through the tube 14, as best shown in FIG. 2. In accordance with the present invention, the take-up mechanisms 6 are rotated with respect to the die pattern by an amount between greater than 0° to less than 180°, as generally represented by the angle α, as best shown in FIG. 3. Note 0° would have no effect and 180° rotation would cause the fibers to contact each other. The rotation is done about the vertical axis through the center line of the tube 14 between the coating dies 12 and the take-up mechanisms 6. Due to the rotation, a smaller cylindrical volume would enclose the fibers where they cross paths without touching approximately midway between the coating dies and the take-up mechanisms, as each optical fiber traverses a diagonal path from the upstream die to the respective downstream guide, thereby coming close together, as best shown in FIG. 4. Advantageously, all the fibers are then able to pass through the curing zone at the same time. Instead of rotating the downstream guides 6, the upstream guides may be rotated instead.

Figure 5:
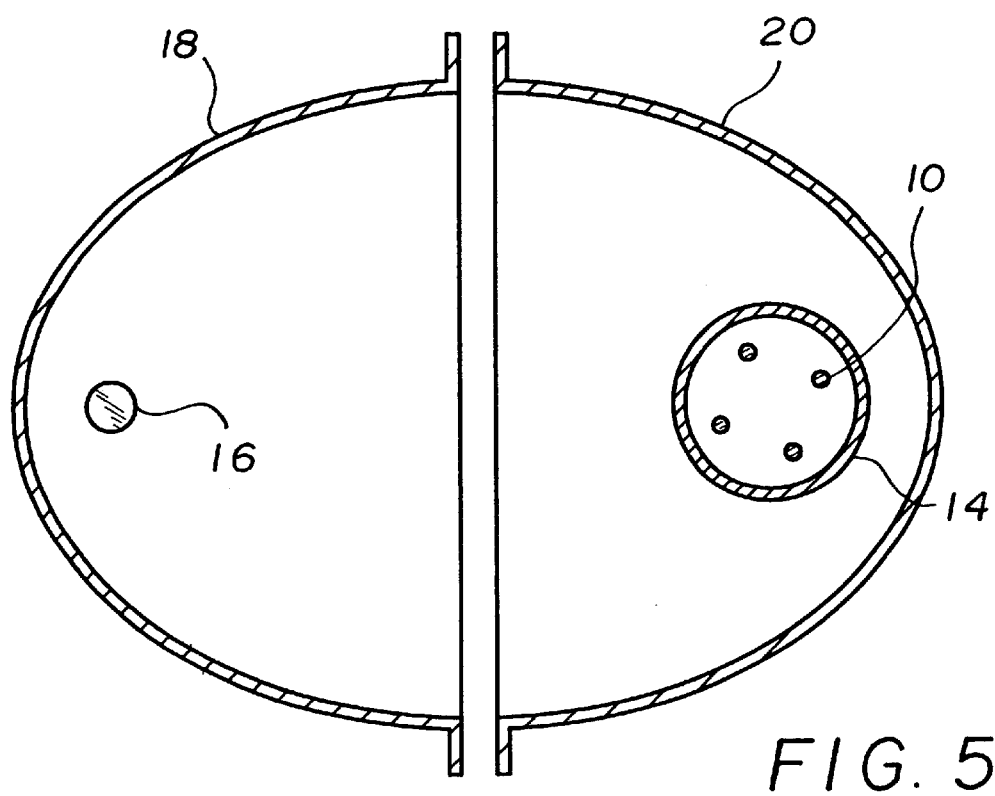
FIG. 5 is a cross-sectional view taken along line 5—5 of FIG. 4.
Figure 6:
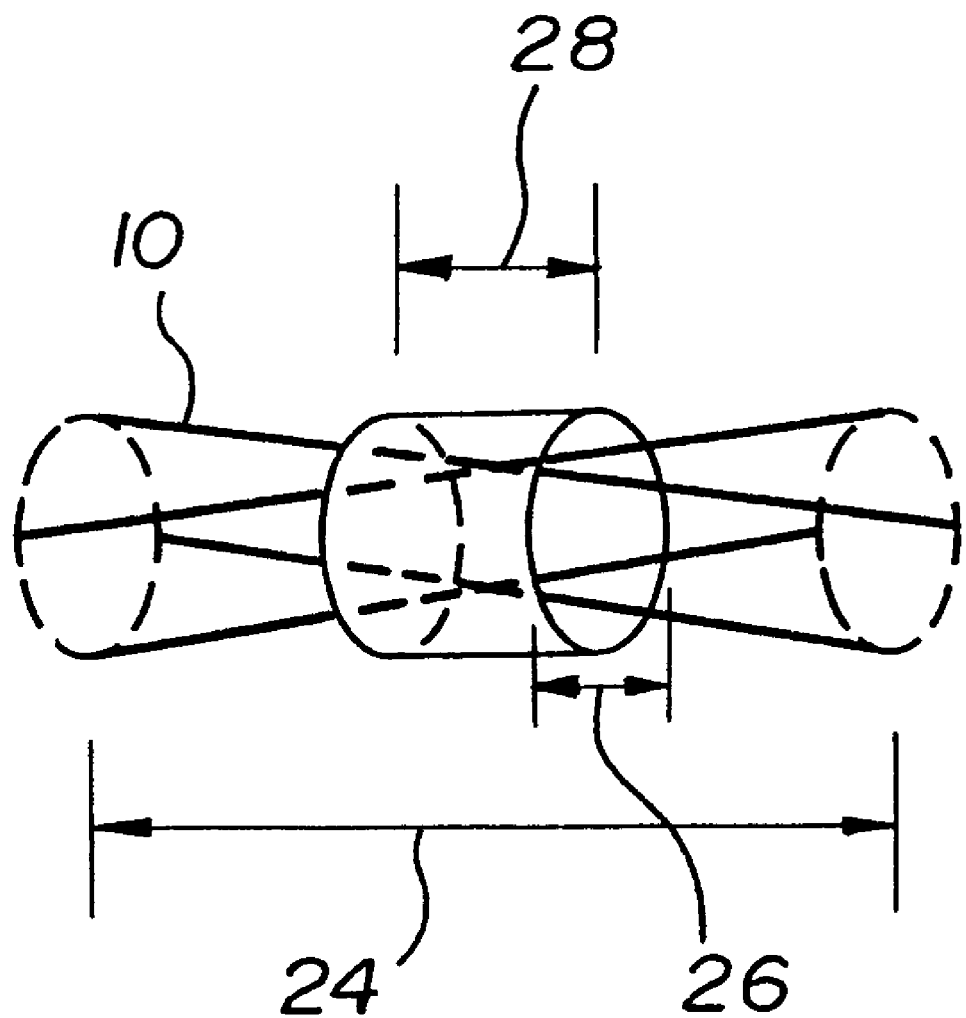
FIG. 6 is a schematic perspective view of the optical fibers passing through the curing zone, showing the relationship between the distance between the upstream dies and the downstream take-up guides, spacing between the guides set, and the diameter and length of the curing zone.

Referring to FIG. 5, it is seen that the fibers 10 passing through the curing zone within the tube 14 do not touch each other. With the rotation, each fiber will pass much closer to the center of the curing zone than if rotation had not been provided. The amount of rotation of the fibers depends on several factors. Referring to FIG. 6, the dies 4 and the take-up mechanisms 6 are at a distance 24 from each other, with the curing zone in between. For a given amount of rotation, a longer distance 24 will decrease the aperture 26 required to enclose the optical fibers. Similarly, a shorter curing zone length 28 will reduce the size of the aperture 26 required.

As can be seen from the discussion above, multiple fibers can simultaneously pass through the curing zone, all receiving a similar exposure from the high-intensity radiation energy. By having a smaller diameter curing zone, the passing fibers are subjected to higher intensity energy.

Although optical fibers coated with UV curable coating were used to describe the invention, the invention is equally applicable to other fibers or wire-like elements coated with other materials that respond to non-UV radiation for curing.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A method for passing multiple fibers having curable coating thereon through a high intensity curing zone, comprising:

a) providing a curing zone having a diameter;

b) providing a plurality of feed guides upstream of said curing zone to guide the fibers through the curing zone c) providing a plurality of take-up guides downstream of said curing zone to take-up the fibers passing through the curing zone;

d) rotating the upstream and the downstream guides relative to each other about a longitudinal axis through the centerline of the curing zone so that the fibers at an intermediate location between the upstream and downstream guides define a cylindrical volume having a diameter less than the diameter of the curing zone.

2. A method as in claim 1, wherein said rotating is between greater than 0° and less than 180°.

* * * * *